United States Patent [19]
Su et al.

[11] Patent Number: 5,386,743
[45] Date of Patent: Feb. 7, 1995

[54] TURRET INDEXING DEVICE

[75] Inventors: Win-Jim Su; Ching-Yuan Lin; Jung-Hong Huang, all of Hsinchu Hsien, Taiwan, Prov. of China

[73] Assignee: Industrial Technology Research Institute, Hsinchu, Taiwan, Prov. of China

[21] Appl. No.: 90,511

[22] Filed: Jul. 13, 1993

[51] Int. Cl.[6] ............................................. B23B 29/24
[52] U.S. Cl. ................................ 74/813 L; 74/813 R; 82/61
[58] Field of Search ............. 74/813 R, 813 C, 813 L, 74/820, 816, 826; 82/61, 67

[56] References Cited

U.S. PATENT DOCUMENTS

| | | | |
|---|---|---|---|
| 4,524,655 | 6/1985 | Waldron et al. | 74/813 L |
| 4,668,134 | 5/1987 | Vindez | 74/813 L |
| 4,785,513 | 11/1988 | Lee et al. | 74/826 X |
| 4,979,855 | 12/1990 | Babel | 74/813 L X |
| 5,090,267 | 2/1992 | Gramling | 74/813 L |
| 5,188,004 | 2/1993 | Kitagawa | 74/813 R |

FOREIGN PATENT DOCUMENTS

| | | | |
|---|---|---|---|
| 56-114648 | 9/1981 | Japan | 74/813 C |
| 4-30943 | 2/1992 | Japan | 74/813 R |

*Primary Examiner*—Vinh T. Luong
*Attorney, Agent, or Firm*—W. Wayne Liauh

[57] ABSTRACT

In a turret indexing device, a coupling containing three gear members is employed in a turret indexing device to cooperate with an indexing disc mounted on an output shaft which is adapted to hold an indexing head. The coupling is operated by a first cam fixedly mounted on an input shaft through a lever mechanism, and the indexing disc is driven by a second cam fixedly mounted on the same input shaft. The three gear members include a first gear member fixedly mounted on a collar slidably mounted on the output shaft, a second gear member which is fixedly mounted on a stationary housing, and third gear member fixedly mounted on a head end of the output shaft. The collar with the first gear member is operated by the lever mechanism to cause the first gear to engage with and disengage from the second gear member and the third gear member while the first cam rotates, in a present timing sequence, and the indexing disc is caused to rotate only when the first gear member is disengaged from the second gear member and the third gear member.

3 Claims, 8 Drawing Sheets

TURRET INDEXING DEVICE

FIELD OF THE INVENTION

This invention relates to a turret indexing device for use in a CNC (completely numerically controlled) lathe. More particularly, this invention relates to a tool turret indexing device employing a coupling unit containing three face-gears operated by a cylindrical cam in association with the combination of a conjugate cam and an indexing disc without being assisted by a hydraulic cylinder or a magnetic brake.

BACKGROUND OF THE INVENTION

Among conventional CNC lathes, there is a turret type CNC lathe having a tool turret indexing device operated by hydraulic cylinders for indexing the tool turret for changing and positioning the tool selected by a control unit. As most hydraulic cylinders applicable for a turret type CNC lathe are relatively bulky, hydraulic-operated tool turret indexing devices are generally built to the lathe manufacturer's own specification, and its operating speed is relatively slow; in most cases, it requires two seconds to complete one cycle of a tool changing operation.

There is another type of CNC lathe having a tool turret indexing device operated by solenoid units and magnetic brakes. In this order type of tool turret indexing device, a positioning pin (or pins) is employed in addition to the magnetic brakes to ensure the accuracy of indexing. But because of this, the device produces shocks and noises in each indexing operation. Furthermore, the positioning pin, which is inevitably subjected to constant shocks, tends to break easily and frequent repairs are necessary.

In order to eliminate the abovementioned problems with conventional tool turret indexing devices, a so-called roller-gear-cam-type tool turret indexing device employing a spiral-faced cam has been developed. This new tool turret indexing device contains a coupling device employing a first face gear fixedly mounted on an indexing shaft having one end formed into an indexing head on which tools are mounted, and a second face gear fixedly mounted on a stationary housing to be engaged with the first face gear. The indexing shaft is operated by a cam device driven by an input shaft to cause the indexing shaft to slide in one direction to cause the first face gear to disengage from the second face gear, and in an opposite direction to cause the first face gear to engage with the second face gear in a predetermined timing sequence. When the first face gear is disengaged from the second face gear, the indexing shaft is rotated by indexing rollers mounted on the indexing shaft. These indexing rollers are driven by a spiral-faced cam fixedly mounted on the same input shaft.

Figure 1:
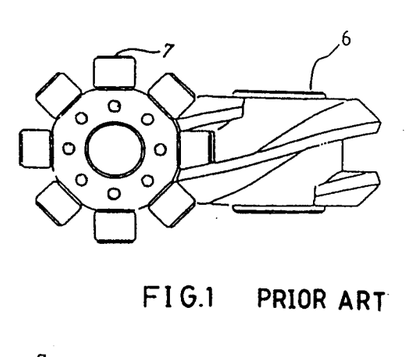
FIG. 1 is a cross-sectional view of a conventional roller gear cam type turret indexing device.
Figure 2:
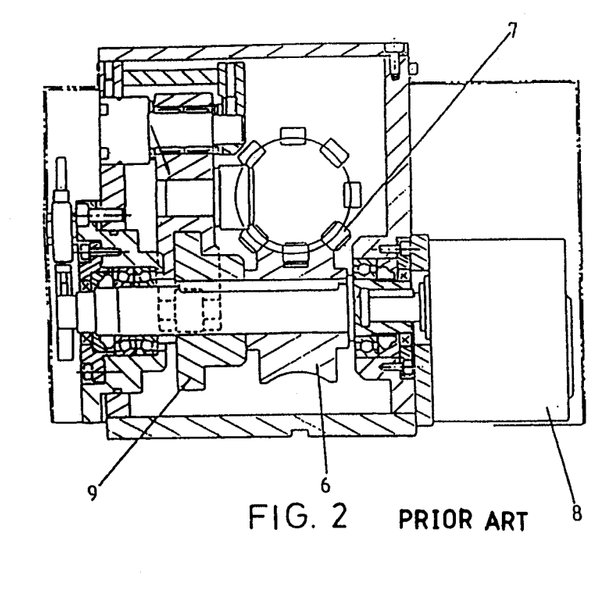
FIG. 2 is another cross-sectional view of the roller gear cam type turret indexing device of FIG. 1.
Figure 3:
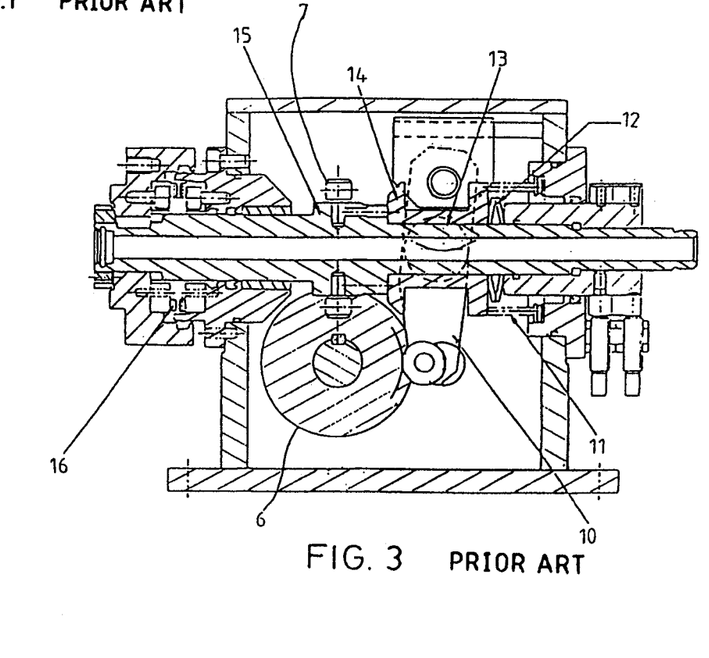
FIG. 3 is a schematic drawing showing the arrangement and configuration of the roller gear cam set employed in the roller gear cam type turret indexing device of FIG. 1.

As shown in FIGS. 1, 2, and 3, the abovementioned roller-gear-cam type turret indexing device contains an input shaft 108A driven by a motor 108, a first cam 109 and a second cam 106 fixedly mounted on input shaft 108A and output shaft 119 having an indexing head 120 fixedly mounted on one end of output shaft 119, a thrust collar 114 fixedly mounted on output shaft 119, an indexing flange 115 integrally formed with output shaft 119, and a plurality of rollers mounted around the periphery of indexing flange 115.

A lever 110 is provided to be driven by first cam 109 to operate thrust collar 114 such that thrust collar 114 is caused to move in an axial direction while first cam 109 rotates.

A plurality of rollers 107 are driven by second cam 106 such that indexing flange 115 rotates a predetermined angle while second cam 106 rotates one complete rotation.

A coupling device containing a first-face gear 116A fixedly mounted on indexing head 120, and a second face gear 116B fixedly mounted on housing 101 which is provided to allow the rotation of output shaft 119 or lock output shaft 119 in place, with respect to housing 101.

In operation, output shaft 119 is moved axially forward to disengage first face gear 116A and second face gear 116B of the coupling device while first cam member 109 rotates to cause lever member 110 to operate and consequently the thrust collar 114 to move in a predetermined period sector of an indexing cycle.

As soon as first face gear 116A has been disengaged from second face gear 116B of the coupling device, the output shaft 119 is caused to rotate a predetermined angle as second cam member 106 rotates to cause rollers 107 and consequently, indexing disc 115 to rotate a predetermined angle equivalent to an indexing angle.

As soon as output shaft 119 has rotated the predetermined angle, first cam member 109 rotates to a position where thrust collar 124 is moved by lever member 110 to cause output shaft 119 to move axially back to its original position such that first face gear 116A is caused to engage with second face gear 116B of the coupling device to lock input shaft 108A in place onto housing 101 so as to complete the indexing cycle.

As described above, in the so-called roller-gear-cam-type turret indexing device, the indexing shaft is moved axially before and after the indexing head is rotated. Therefore, the movement of the relatively heavy output shaft tends to create a vibration.

Furthermore, in the above-mentioned "roller-gear-cam type" turret indexing device, the spiral-faced cam requires a highly precise finishing in order to assure an accurate indexing performance and such requirement tends to incur a high manufacturing cost. Moreover, the movement of the indexing head formed at one end of the indexing shaft tends to allow cutting chips to fall onto the surface of indexing shaft to hinder the indexing operation.

The turret indexing device of the present invention has effectively eliminated the above-mentioned problem with the conventional roller-gear-cam type turret indexing device.

SUMMARY OF THE INVENTION

The turret indexing device of this invention has an input shaft driven by a hydraulic motor, to rotate a first cam member fixedly mounted on the input shaft for operating a lever member, a second cam member for operating an indexing disc fixedly mounted on an output shaft having one end formed into an indexing head, and a coupling operable by the lever member and a thrust collar slidably mounted onto the output shaft to lock the output shaft on the housing and unlock the output shaft. When the input shaft is caused to complete one rotation (one indexing cycle), first cam member is caused to complete one rotation which in turn causes the coupling member to disengage and engage, and second cam member is also caused to rotate one rotation to cause the indexing disc to rotate a predetermined angle during the period that the coupling is disengaged.

The coupling member includes a first gear member fixedly mounted to the thrust collar, a second gear member fixedly mounted onto a stationary housing, and a third gear member fixedly mounted on the back side of the indexing head of the output shaft, the third gear member being disposed in an inner bore of the second gear member. Each one of the first gear member, second gear member and third gear member is of a face-gear type which is a gear having a disc-like body and daisy-like gear teeth formed on one side of the disc-like body. The gear teeth of the first gear member are capable of engaging with the gear teeth of second gear member, and the gear teeth of third gear member to mechanically positively couple second gear member with the third gear member, or to cause the coupling to be "engaged". When the gear teeth of first gear member are caused to disengage from the gear teeth of the second gear member and the gear teeth of third gear member, the coupling is "disengaged".

The second cam member has a cylindrical body and two cams integrally formed at two sides of the cylindrical body; each one of the two cams has a cam profile of modified-sine curve, and a center axis at a predetermined angle with each other.

The second cam member is fixedly mounted onto the input shaft to drive the indexing disc fixedly mounted on the output shaft in such a manner that the indexing wheel is caused to rotate an indexing angle during the period that the coupling device is disengaged, and the output shaft is locked in place as soon as the output shaft has completed its rotation of the indexing angle and the coupling device is "engaged".

An encoder is coupled to a tail end of the output shaft to deliver a signal to the control unit to stop the hydraulic motor as soon as the output shaft has rotated an indexing angle and the coupling device has been engaged.

The input shaft is rotatably supported on the housing through bearings, each one of which is provided with an eccentric adjusting collar to enable a fine adjustment of the distance between the input shaft and the output shaft.

The head end of the output shaft, which is adapted to hold a tool holder or an indexing head, is rotatably supported on to the housing by a tapered roller bearing to render a higher rigidity of the supporting structure for the output shaft, so as to enable a heavy cutting operation without creating a vibration.

A large-sized seal is provided between the head end of the output shaft and the housing to effectively prevent foreign material from entering into the interior of the turret indexing device.

A disc spring is provided between the first cam member and a flanged portion of the input shaft to ensure a tight fitness of the first cam with respect to the input shaft.

BRIEF DESCRIPTION OF THE DRAWINGS

FIG. 9-A is a timing chart showing the timing of the operations of the cylindrical cam and the coupling of the turret indexing device of FIG. 4;

FIG. 9-B is a timing chart showing the timing of the operations of the parallel conjugate cam and the output shaft of the turret indexing device of FIG. 4;

DETAILED DESCRIPTION OF A PREFERRED EMBODIMENT

Figure 4:
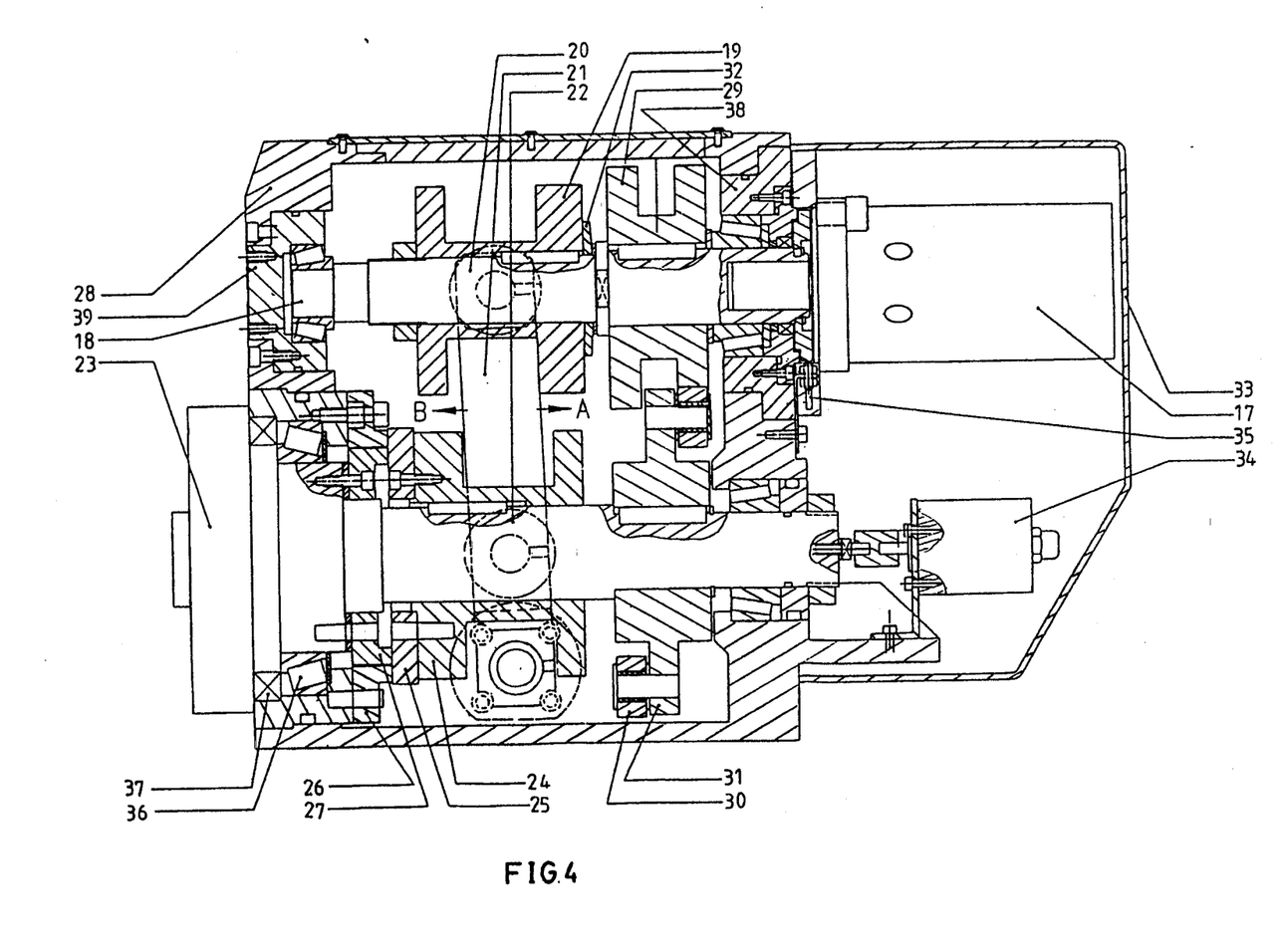
FIG. 4 is a cross-sectional view of the turret indexing device of the present invention showing its general arrangement.

FIG. 4 illustrates an embodiment of the turret indexing device of the present invention in which:
17 is a hydraulic motor;
18 is an input shaft;
19 is a cylindrical cam (first cam member);
20 is a first roller;
21 is a lever;
22 is a second roller;
23 is an output shaft;
24 is a thrust collar;
25 is a first gear member of the coupling;
26 is a second gear member of the coupling;
27 is a third gear member of the coupling;
28 is a housing;
29 is a parallel conjugate cam (second cam member);
30 is a third roller;
31 is an indexing disc;
32 is a disc spring;
33 is a cover;
34 is an encoder;
35 is a limit switch;
36 is a tapered roller bearing;
37 is a sealing member;
38 is a first bearing;
39 is a second bearing;

Input shaft 18 is rotatably mounted onto housing 28 through first bearing 38 and second bearing 29 and is driven by hydraulic motor 17 which is controlled by control unit CU.

Cylindrical cam 19 is fixedly mounted on input shaft 18 with a key member 18A to ensure that the cylindrical cam rotates with input shaft 18.

Parallel conjugate cam 29 is fixedly mounted onto input shaft 18.

Disc spring 32 is mounted between cylindrical cam 19 and a flange integrally formed on input shaft 18 to ensure a tight fitness of cylindrical cam 19 with input shaft 18.

Output shaft 23, which is an indexing shaft, is rotatably mounted onto housing 28 in parallel with input shaft 18 with indexing disc 31 fixedly mounted onto output shaft 23.

Encoder 34 is coupled to a tail end of output shaft 23 to deliver a signal to control unit CU when output shaft 23 has been rotated to a predetermined position.

Thrust collar 24 is rotatably mounted on output shaft 23 with a key member 23A inserted between thrust collar 24 and output shaft 23 to ensure that thrust collar 24 rotates with output shaft 23; thrust collar is capable of sliding along output shaft 23.

Indexing disc 31 is provided with a plurality of third rollers 30 to be explained in more detail later.

Lever 21 has one end pivotally mounted on housing 28 and an opposite end provided with first roller 20 to engage with cylindrical cam 19, and second roller 22 rotatably mounted on a suitable position between the two ends of lever 21 such that second roller 22 engages with thrust collar 24.

First gear member 25 of the coupling is fixedly mounted onto thrust collar 24, second gear member 26 of the coupling is fixedly mounted on housing 28, and the third gear member 27 of the coupling is fixedly mounted on the back side of the head end 23A of output shaft 23, the head end 23A being adapted to hold a tool holder or an indexing head, not shown.

Figure 11A:
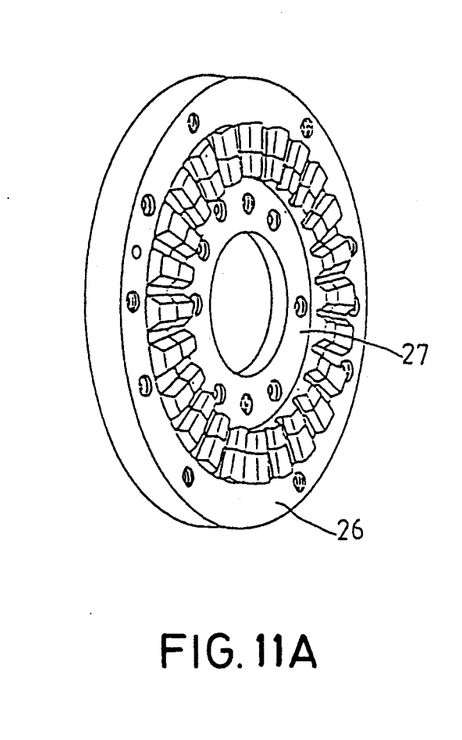
FIG. 11 is another exploded perspective view of the coupling of FIG. 10, wherein the third face gear member is fitted in the inner bore of the second face gear member.
Figure 11B:
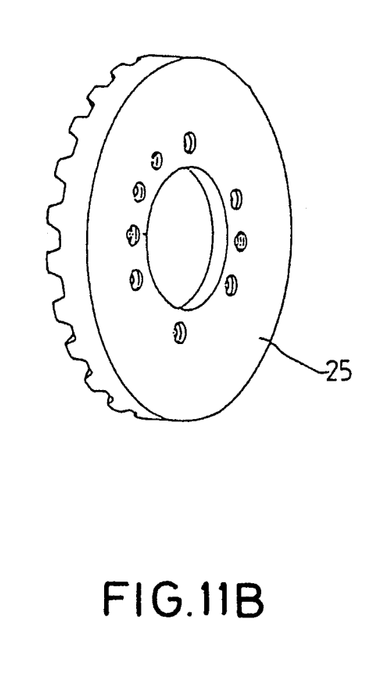
Figure 12:
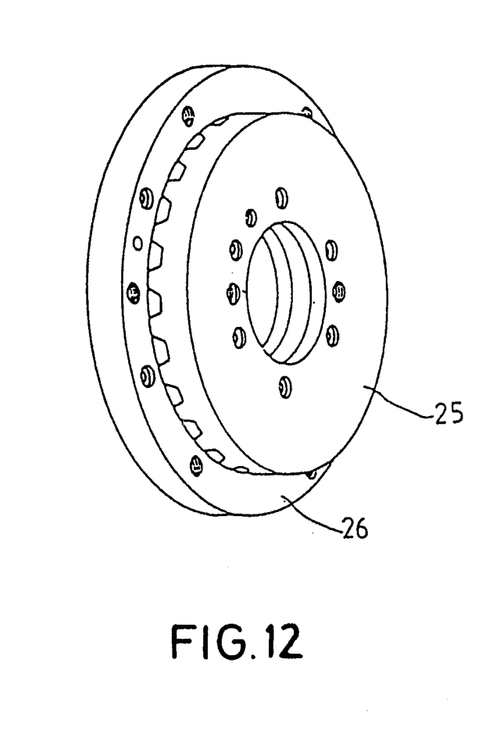
FIG. 12 is a perspective view of the coupling of FIG. 10 showing its engaged condition.

As shown in FIG. 11, third gear member 27 of the coupling is rotatably fitted in an inner bore of second gear member 26 of the coupling. The third gear member 27 of the coupling has same number of gear teeth to correspond with the gear teeth of second gear member 26 of the coupling in such fashion that, the gear teeth of the third gear member 27 of the coupling are radially aligned with the gear teeth of second gear member 26, as shown in FIG. 11. First gear member 25 of the coupling has same number of gear teeth such that the gear teeth of first gear member 25 are capable of engaging with and disengaging from the gear teeth of second gear member 26 and third gear member 27 by moving the first gear member 25 toward and away from second gear member 26 and third gear member 27.

With third gear member 27 of the coupling fitted in the inner bore of second gear member 26, second gear member 26 and third gear member 27 will be mechanically positively coupled when first gear member 25 is moved toward the combination of second gear member 26 and third gear member 27 to cause the gear teeth of first gear member 25 to engage with the gear teeth of second gear member 26 and third gear member 27.

Following the same principle, second gear member 26 and third gear member 27 of the coupling are mechanically disconnected when first gear member 25 is moved away from the combination of the second gear member 26 and third gear member 27 to cause the gear teeth of the first gear member 25 to disengage from the gear teeth of second gear member 26 and third gear member 27.

Figure 5:
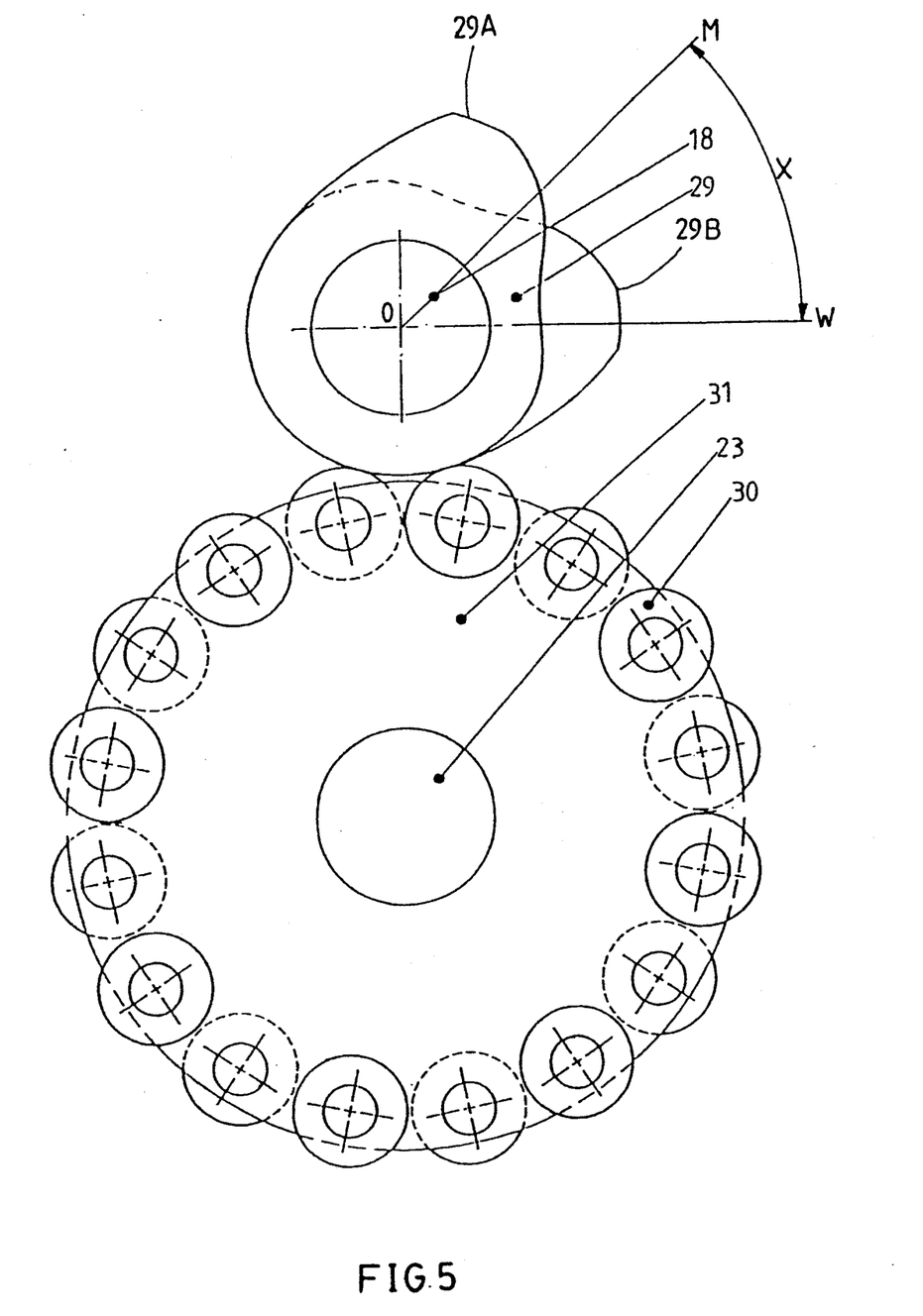
FIG. 5 is a schematic drawing showing the configuration and the arrangement of the parallel conjugate cam and the indexing disc employed in the turret indexing device of FIG. 4.

Indexing disc 31 has a flange portion and a plurality of third rollers 30A and 30B are rotatably mounted on both sides of the flange portion in alternative arrangement, as shown in FIG. 5, to be driven by parallel conjugate cam 29 fixedly mounted on input shaft 18.

In operation, hydraulic motor 17 is caused to rotate by a control unit CU, to cause input shaft, 18 to rotate in a direction determined by control unit CU.

Following are operational sequences:
1) Hydraulic motor 17, upon receipt of a driving signal from control unit CU, rotates in a prescribed direction to cause input shaft 18 to rotate.
2) Cylindrical cam 19 is caused to rotate with input shaft 18.
3) Cylindrical cam 19 causes first roller 20 to move in a direction parallel with the axis of input shaft 18, so as to cause lever 21 to pivot in direction A (FIG. 4).
4) Second roller 22 is caused to move with lever 21 and as a result, thrust collar 24 is caused to slide along output shaft 23 in direction A (FIG. 4).
5) First gear member 25 of the coupling which is fixedly mounted onto one side of thrust collar 24 is caused to move away from the combination of second gear member 26 and third gear member 27 of the coupling, so as to disconnect second gear member 26 from third gear member 27 of the coupling.
6) As soon as second gear member 26 and third gear member 27 are disconnected from each other, parallel conjugate cam 29 which is fixedly mounted on input shaft 18 starts engaging with third rollers 30 of indexing disc 31 to cause output shaft 23 to rotate to perform an indexing operation.
7) As soon as parallel conjugate cam 29 has rotated a prescribed angle to complete the indexing operation, cylindrical cam 19 continues to rotate to a prescribed position where first roller 20 is caused to move in a direction opposite to its initial movement of Step 4) and as a result, lever 21 is caused to pivot in direction B (FIG. 4). Consequently, second roller 22 is caused to move in a direction opposite to its initial direction as described in Step 4) to cause thrust collar 24 to move toward the head end of output shaft 23; first gear member 25 is therefore caused to move toward the combination of second gear member 26 and third gear member 27 of the coupling and as a final result, third gear member 27 which is fixedly mounted on the head end of output shaft 23 is mechanically positively coupled to second gear member 26 which is fixedly mounted on housing 28. At this stage, the head end of output shaft 23 where the indexing head is mounted is now locked in position onto housing 20.

Figure 6:
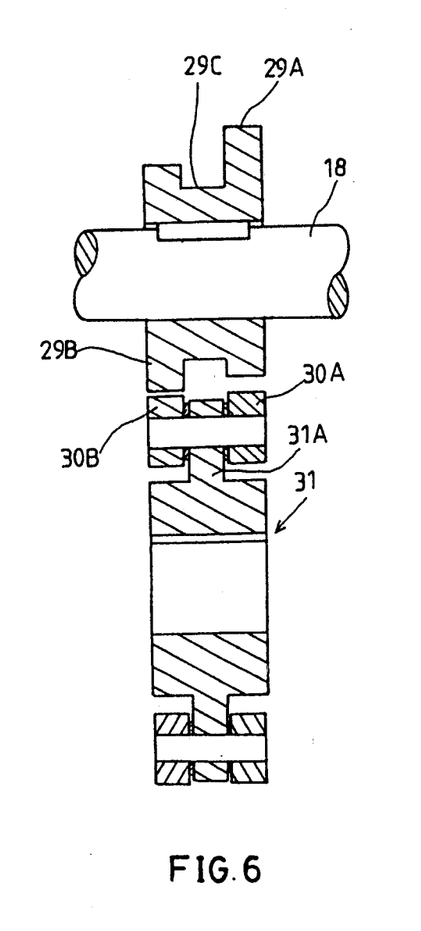
FIG. 6 is a cross sectional side view of the parallel conjugate cam and the indexing disc of FIG. 5.

FIGS. 5 and 6 illustrate the arrangement of parallel conjugate cam 29 with respect to indexing disc 31. As shown in FIG. 6, parallel conjugate cam 29 has front cam 29A and second cam 29B integrally formed with a cam body 29C and fixedly mounted on input shaft 18, wherein front cam 29A has cam center line OM angularly apart from center line OW of rear cam 29B respectively at an angle X, as shown in FIG. 5.

Indexing disc 31 has a disc portion 31A, as shown in FIG. 6, and a plurality of rollers 30A rotatably mounted on one side of disc portion 31A to correspond with front cam 29A of parallel conjugate cam 29, and another plurality of rollers 30B on another side of disc portion of indexing disc 31 to correspond with rear second cam 29B of parallel conjugate cam 29.

It should be noted that rollers 30A and 30B are arranged in an alternative relation with each other. When parallel conjugate cam 29 rotates one rotation (360 degrees) with the rotation of input shaft 18, indexing disc 31 is driven by parallel conjugate cam 29 through rollers 30A and 30B to rotate at an angle defined by the movement of one roller 30A driven by front cam 29A and the movement of another roller 30B driven by rear cam 29B of parallel conjugate cam 29.

The angle X of parallel conjugate cam 29 and the number of rollers 30A and 30B depend on the number of tools provided on the indexing head to be indexed.

Figure 7:
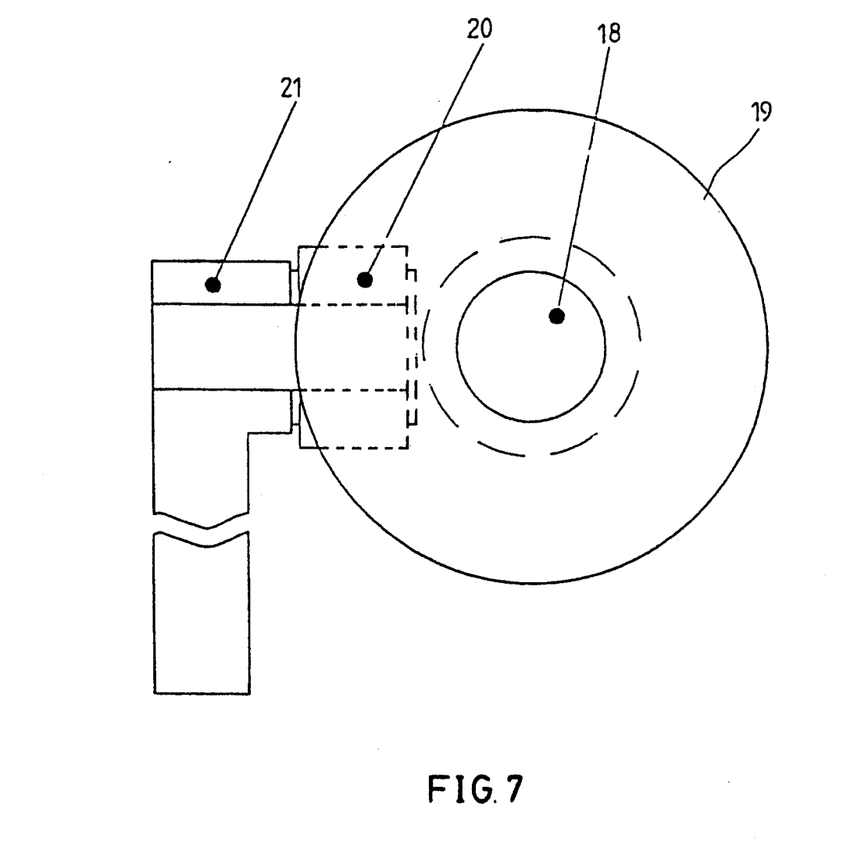
FIG. 7 is a schematic drawing showing the relation between the cylindrical cam and the first roller employed in the turret indexing device of FIG. 4.
Figure 8:
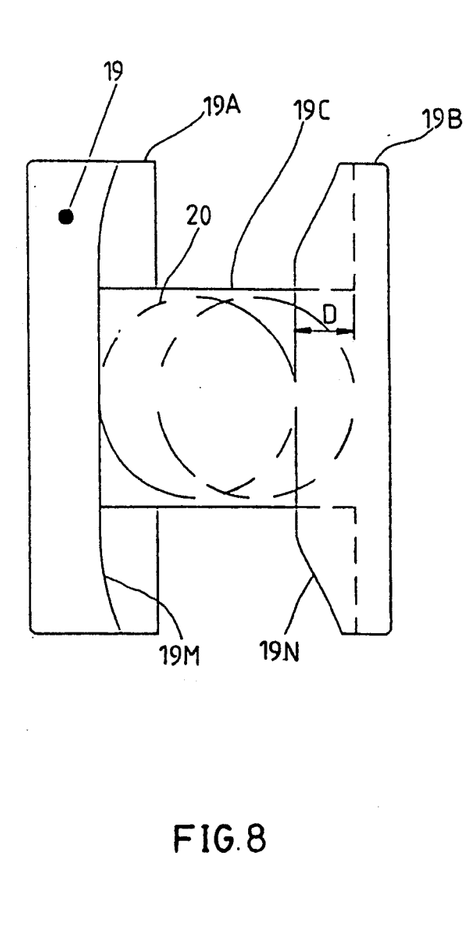
FIG. 8 is another schematic drawing showing a side view of the cylindrical cam and the movements of the first roller of FIG. 7.

Cylindrical cam 19 shown in FIGS. 7 and 8 has two circular flanges 19A and 19B integrally connected by a cylindrical body 19C, flange 19A has an inner cam surface 19M and flange 19B has an inner cam surface 19N.

First roller 20 is mounted on a free end of lever 21 and is rotatably disposed between cam surface 19M of flange 19A and cam surface 19N of flange 19B of cylindrical cam 19. When cylindrical cam 19 rotates from one position to another, roller 20 is caused to move in a direction parallel with the center axis of cylindrical cam 19 (which is also the center axis of input shaft 18, a distance D) and when cylindrical cam 29 rotates from still another position to further another position, roller 20 is caused to move in an opposite direction the same distance D so as to cause lever 21 to pivot back to its original position.

Figure 9A:
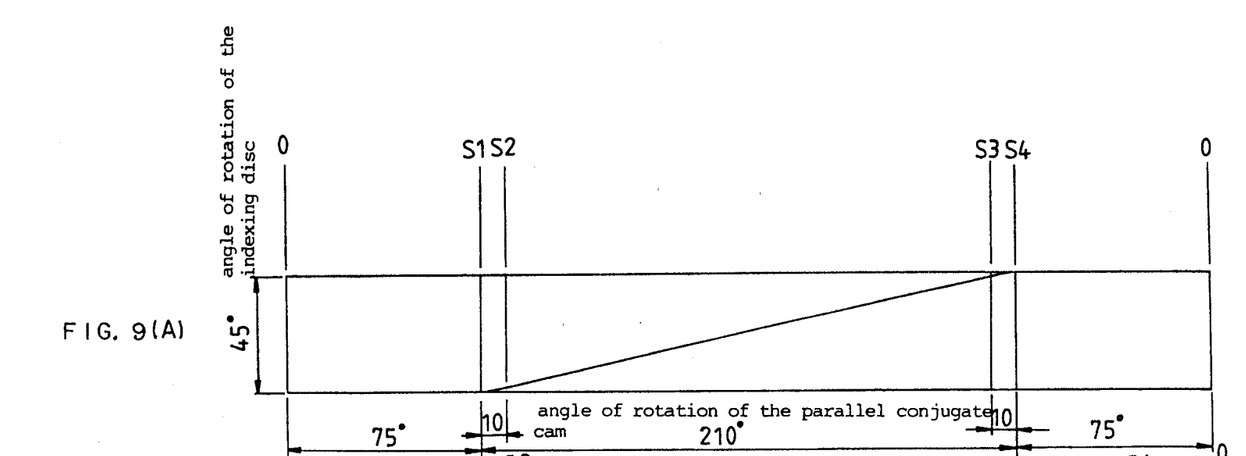
Figure 9B:
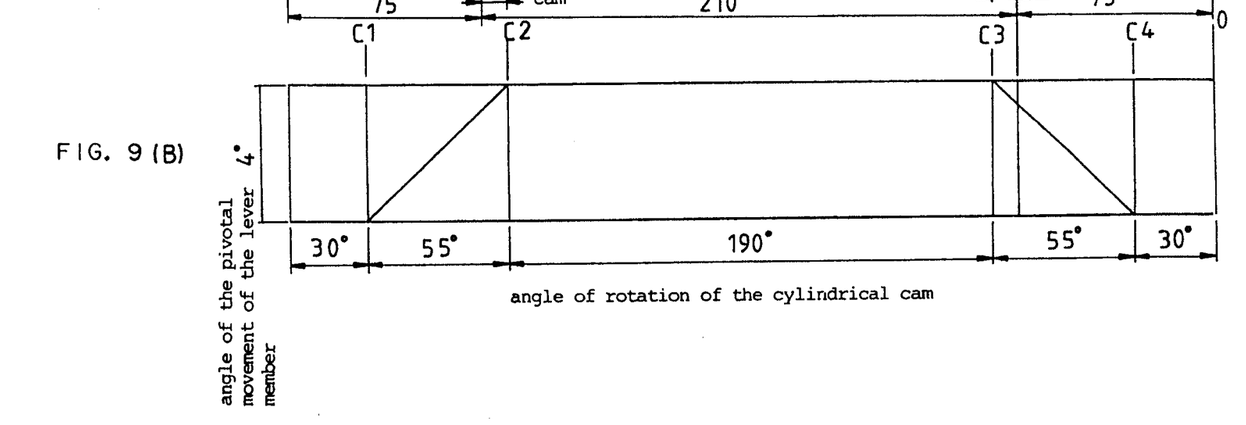
Figure 10A:
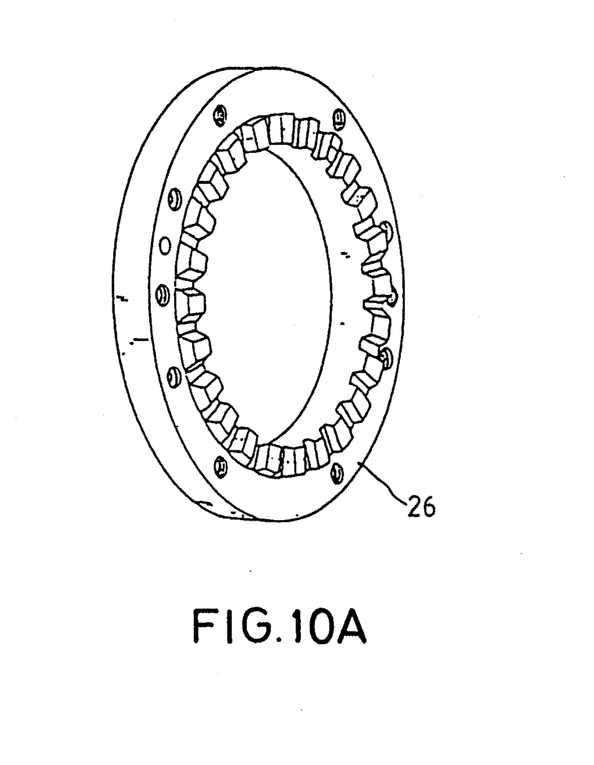
FIG. 10 is an exploded perspective view of the coupling employed in the turret indexing device of FIG. 4.
Figure 10B:
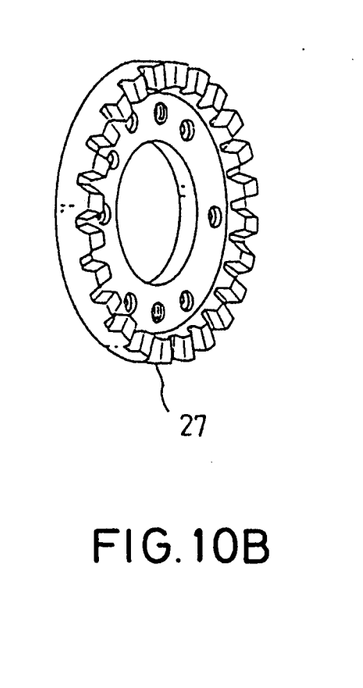
Figure 10C:
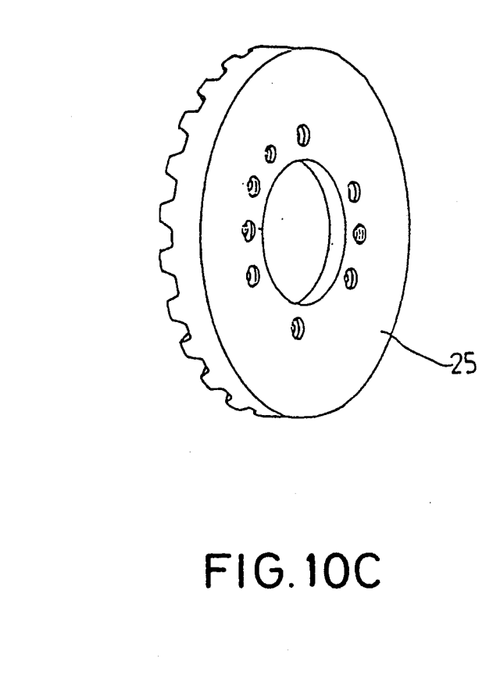

The relation between cylindrical cam 19 and the parallel conjugate cam 29 will be described in more detail as follows:

Cylindrical cam 19 and parallel conjugate cam 29 are so mounted on input shaft 18 that the rotation of indexing disc 31 and the movement of thrust collar 24 or the coupling are performed at a predetermined timing relation, as shown in FIGS. 9A and 9B, wherein FIG. 9A illustrates the movement of parallel conjugate cam 29 and FIG. 9B illustrates the movement of cylindrical cam 19.

In a preferred embodiment, parallel conjugate cam 29 is so designed to rotate 75 degrees from an origin O, as shown in FIG. 9A without causing indexing disc 31 to rotate. After parallel conjugate cam 29 has rotated 75 degrees (to position S1), indexing disc 31 is caused to rotate, and as soon as parallel conjugate cam 29 has rotated 210 degrees (to position S4), indexing disc 31 is caused to rotate at an angle of 45 degrees and then, parallel conjugate cam 29 continues to rotate the remaining angle of 75 degrees without causing indexing disc 31 to further rotate over 45 degrees.

When parallel conjugate cam 29 starts rotating at origin O, cylindrical cam 19 also starts rotating at the same rotational speed an angle of 30 degrees to first position C1 without causing lever 21 or thrust collar 24 to move.

Cylindrical cam 19 continues to rotate from position C1 an angle of 55 degrees to position C2 and during this rotational period, lever 21 is caused to pivot an angle of 4 degrees; after position C2, cylindrical cam 19 continues to rotate an angle of 120 degrees to position C3 without causing lever 21 to move in either direction. After position C3, cylindrical cam 19 continues to rotate another 55 degrees to position C4 to cause lever 21 to pivot in a reverse direction an angle of 4 an angle of four degrees; and from position C4, cylindrical cam 19 continues to rotate an angle of 30 degrees to complete one rotation. At position C1 of cylindrical cam 19, where lever 21 starts to pivot, which is 30 degrees from origin O, indexing disc 31 remains still until parallel conjugate cam 29 rotates to position S1 which is 10 degrees before cylindrical cam 19 comes to position C2, where lever 21 completes its first movement to complete the disengagement of the coupling, and indexing disc 31 starts to rotate. At this position, the coupling has disengaged to enable the rotation of output shaft 23, which rotation is an indexing operation of indexing disc 31, and the rotational movement of indexing disc 31 continues until parallel conjugate cam 29 rotates to position S4, or 10 degrees after position C3 where lever 21 starts to pivot back so as to cause the coupling to engage. The 10 degrees advance timing is determined by the clearance between first member 25 and second member 26 of the coupling at the position of complete disengagement of the coupling.

In summary, cylindrical cam 19 and parallel conjugate cam 29 are so mutually related to assure that indexing disc 31 is allowed to rotate during the period that the coupling is disengaged.

In a preferred embodiment, the above described set-up of cylindrical cam 19 and parallel conjugate cam 29 enables an indexing operation cycle in 0.2 secs.

In the above described arrangement, it should be noted that the turret indexing device of this invention employs a cam mechanism which reduces the acceleration and deceleration of the moving parts, and therefore the shocks and vibrations are effectively minimized. The cylindrical cam employs a Modified Sine curve which enables smooth and quiet operations of the coupling. Hence, the shocks and vibrations caused by the movement of relatively heavy parts having greater inertia in the case of conventional turret indexing devices employing a hydraulic cylinder or a magnetic brake can be effectively eliminated.

Furthermore, the parallel conjugate cam 29 employed in the turret indexing device of this invention can be easily manufactured by a conventional, three spindle-type CNC milling machine without any difficulties; therefore, the manufacturing cost of the turret indexing device of this application will be significantly lower than that of conventional devices of the kind.

It should also be noted that the coupling contains first, second, and third gear members 25, 26 and 27 to cooperate with each other within a housing which is sealed by seal 37, thus, the operation of the turret indexing device will not be hindered by the entry of foreign materials such as cutting chips. It should be noted further that the parallel conjugate cam 29 and the cylindrical cam 19 cooperate with each other in a predetermined timing relation and the coupling operates to rotate the output shaft 23 to perform an indexing operation without causing output shaft 23 to move axially and therefore, the inertia effect of the relatively heavy output shaft on the indexing operation is effectively avoided; more particularly, the indexing operation is performed by merely moving the relatively light-weighted thrust collar 24 (whose weight is approximately 1/20 of the weight of the output shaft) and therefore, a faster and smoother indexing operation (to be completed within 0.2 secs.) is thus possible.

In the turret indexing device of this invention, a large tapered roller bearing 36 is used to support the head end of output shaft 23 so as to provide a higher rigidity of the mounting of the output shaft. Such an arrangement assures a higher precision of finishing operation. Therefore, even the lathe in which the present indexing head is employed is used for performing a heavy cutting operation. The tapered roller bearing 36 also prevents output shaft 23 from moving axially.

Bearings 38 and 39 are provided with eccentric adjusting collars 38A and 39A for adjusting the distance between input shaft 18 and output shaft 23 so that dimensional variations caused by mass production of input shaft 18 and output shaft 23, and housing 28 can be effectively compensated in the final assembly of the turret indexing device to assure dimensional accuracy particularly with regard the center distances between the input shaft and output shaft. As a result, a quiet and smooth indexing operation can be assured.

Disc spring 32 is mounted in between collar 18B of input shaft 18 and cylindrical cam 19 so as to absorb dimensional deviation created by mass production to assure that cylindrical cam 19 is tightly mounted on input shaft 18.

The turret indexing device, as described herein with reference to a preferred embodiment illustrated in the drawings, employs a unique configuration of the cylindrical cam and parallel conjugate cam and therefore, a quiet and accurate indexing performance is assured.

The coupling also renders accurate and smooth indexing operation without causing the relatively heavy output shaft to move axially in each indexing cycle.

The device of this invention employs a coupling which eliminates the axial movement of the output shaft, a large-sized sealing member which prevents foreign materials from entering into the interior of the device, a tapered roller bearing to support the indexing head to render a higher rigidity, eccentric adjusting colors to enable a fine adjustment of the center distances between the input shaft and output shaft, As an overall result, the production cost is reduced and the indexing performance is improved over any conventional devices of the kind.

As a preferred embodiment of the turret indexing device has been illustrated and described in reference to the drawings, it should be understood that modifications are possible without departing from the principles and spirit defined in the appended claims.

What is claimed is:

1. A turret indexing device, comprising:
   a housing;
   an input shaft rotatable mounted onto said housing and driven by a hydraulic motor controlled by a controlling unit;
   a first cam member and a second cam member fixedly mounted on said input shaft;
   an output shaft rotatably mounted onto said housing, said output shaft having a head end adapted to hold an indexing head on which a plurality of tools are mounted;
   a thrust collar slidably mounted on said output shaft and operable by said first cam member through a lever mechanism;
   an indexing disc fixedly mounted on said output shaft and operable by said second cam member to rotate a predetermined angle when said second cam member rotates one rotation o 360 degrees; and
   coupling means comprising a first gear member fixedly mounted on said thrust collar, a second gear member fixedly mounted onto said housing, and a third gear member fixedly mounted onto said head end of said output shaft; wherein each one of said first gear member, said second gear member, and said third gear member has a same number gear teeth, and the gear teeth of said first gear member are capable of engaging with and disengaging from said teeth of said second gear member and the gear teeth of said third gear member.

2. The turret indexing device of claim 1, wherein each one of said first gear member, said second gear member, and said third gear member is a face gear having a disc-like body and daisy-like gear teeth formed on one side of said disc-like body.

3. The turret indexing device of claim 1, wherein said head end of said output shaft is supported by a tapered roller bearing which prevents said output shaft from moving axially with respect to said housing.

* * * * *